(12) United States Patent
Arethens

(10) Patent No.: US 6,172,638 B1
(45) Date of Patent: Jan. 9, 2001

(54) SATELLITE SIGNAL RECEIVER WITH DETECTOR OF INCOHERENCE BETWEEN CODE PHASE AND CARRIER FREQUENCY MEASUREMENTS

(75) Inventor: Jean-Pierre Arethens, Beaumont les Valence (FR)

(73) Assignee: Sextant Avionique, Velizy Villacoublay (FR)

( * ) Notice: Under 35 U.S.C. 154(b), the term of this patent shall be extended for 0 days.

(21) Appl. No.: 09/147,334
(22) PCT Filed: Jun. 3, 1997
(86) PCT No.: PCT/FR97/00968
§ 371 Date: Jan. 15, 1999
§ 102(e) Date: Jan. 15, 1999
(87) PCT Pub. No.: WO97/47985
PCT Pub. Date: Dec. 18, 1997

(30) Foreign Application Priority Data

Jun. 7, 1996 (FR) ................................. 96 07074

(51) Int. Cl.$^7$ ................................. H04B 7/185
(52) U.S. Cl. ................................. 342/357.02
(58) Field of Search ........... 342/357.02, 357.03, 342/357.16; 701/214

(56) References Cited

U.S. PATENT DOCUMENTS

| | | | |
|---|---|---|---|
| 4,646,096 | * | 2/1987 | Brown .............................. 342/357.02 |
| 5,808,581 | * | 9/1998 | Braisted et al. ................ 342/357.02 |
| 5,831,576 | * | 11/1998 | Sheynblat ....................... 342/357.03 |

* cited by examiner

Primary Examiner—Gregory C. Issing
(74) Attorney, Agent, or Firm—Oblon, Spivak, McClelland, Maier & Neustadt, P.C.

(57) ABSTRACT

A satellite signal GPS receiver which is located at a fixed station on the ground. The receivers are used in differential position measurement systems. In order to eliminate as much as possible the influence of multipaths on the precision of the measured position, it is detected whether the position measurements are coherent with the velocity measurements, The coherence is measured by the variations in the difference $V_i-dPRC_i/dt$, where $V_i$ is the relative velocity measured along the axis of the $i^{th}$ satellite and dPRC/dt is the time variation of the measured position. If the coherence is not sufficient, the position variation should not correspond to the measured velocity. The measurement of this satellite is then considered to be tainted with error and the satellite is eliminated. In the absence of multipaths, the above difference should be seen to vary periodically. This variation may be detected by a Fourier transform on a sufficient number of measurement samples.

9 Claims, 1 Drawing Sheet

SATELLITE SIGNAL RECEIVER WITH DETECTOR OF INCOHERENCE BETWEEN CODE PHASE AND CARRIER FREQUENCY MEASUREMENTS

BACKGROUND OF THE INVENTION

1. Field of the Invention

The invention relates to satellite positioning receivers such as GPS (Global Positioning System) receivers.

2. Discussion of the Background

The GPS system uses a constellation of satellites which move around the earth on very precisely determined orbits, that is to say it is possible to know the position of an arbitrary satellite at any time. The satellites transmit radiofrequency signals, containing navigation data and codes which make it possible to identify each satellite. These codes phase modulate a carrier frequency. A GPS receiver, on the ground or on a land, air or sea vehicle, can receive the signals from several satellites simultaneously, precisely calculate its distance from each of the satellites, and deduce therefrom its precise position in latitude, longitude and altitude in a terrestrial frame. It can also deduce therefrom the precise date and time of the reception in the time frame of the GPS system. It can lastly deduce therefrom, by Doppler measurements, its own velocity vector in the terrestrial frame (the case of a receiver mounted on a moving vehicle).

In the GPS system, each satellite is identified by a pseudo-random code which is individual to it and repetitively (for example every millisecond) modulates a carrier frequency which the satellite transmits. There are systems similar to GPS, in particular the GLONASS system, in which this pseudo-random code also exists even though it is not used to identify individual satellites. The invention which will be described is directly applicable to the GLONASS system, but for the sake of simplicity reference will be made below only to the GPS system, and more precisely the "civil" part of the GPS system which also has a military part to which the invention is equally applicable.

The pseudo-random code is a long code (1023 bits at 1.023 MHz, i.e. 1 millisecond), and one of its main functions is to make it possible to extract the satellite's signal from a noise level much higher (for example 30 dB) than the level of the signal. This technique is now widely known as spread spectrum transmission. The signal is extracted from the noise using an operation, in the receiver, of correlation between the received signal and a periodic pseudo-random code which is identical to the one expected to be found in the signal. If the codes do not coincide temporally, there is no correlation between the received signals and the local code generated by a local code generator; if they almost coincide, there is some degree of correlation, the correlation energy becoming stronger as the coincidence becomes more exact. It is therefore possible to establish a correlation signal making it possible to slave a local code generator until exact coincidence is obtained between the local code and the code modulating the signal which the satellite transmits. A code slaving loop then makes it possible to maintain this coincidence.

The pseudo-random code is transmitted by the satellite at extremely precise times which are known at the receiver. Use is made of the correlation operation to determine the arrival time of this code in the receiver: the characteristic time or epoch of transmission of the local code is determined, and since this local code coincides with the received code when the maximum correlation is established, this time represents the arrival time of the received code. The difference between a time at which the code is transmitted via the satellite and a time at which the code is received by the receiver makes it possible to determine a propagation time of the signals between the satellite and the receiver. Knowing that the propagation velocity of the signals is the velocity of light, the distance between the receiver and a given satellite can be calculated. The same operation performed on two other satellites makes it possible, by triangulation, to determine the exact position of the receiver relative to the three satellites.

By using a fourth satellite, the clock errors of the receiver are eliminated, the clock of the receiver not being as precise as that of the satellites. Further to the position of the receiver, it is then possible to calculate a precise time for the position measurement, in the time frame of the GPS satellites.

The position of each of the satellites is known at any time: it is calculated on the basis of tables which are stored in the receiver and are updated by the navigation message broadcast by the satellites. The velocity of the satellites at any time can also be calculated on the basis of these tables.

It is possible to determine, on the basis of the signals sent by four satellites, the time and the position of the receiver relative to the four satellites. Furthermore, by changing co-ordinates, the position of the receiver in a fixed terrestrial frame is obtained.

Similarly, the velocity of the receiver is calculated on the basis of a Doppler-effect measurement on the carrier frequency of the radiofrequency signal sent by the satellites. It is therefore possible to calculate the relative velocity of the receiver with respect to each of the satellites, along the director axis which joins this satellite to the receiver. Four satellites are needed to eliminate the time ambiguity. Four different relative velocity vectors are obtained, along the director axes joining the receiver to the four satellites. Simple calculations make it possible to determine the velocity of the receiver along three axes in the terrestrial frame on the basis of these four velocity vectors and the following information:

the directions of the receiver-satellite director axes with respect to a fixed terrestrial frame (longitude, latitude, altitude); these directions are themselves obtained by knowledge of the position of the receiver at a given time and the position of each satellite at the same time;

the individual velocities of the satellites in the terrestrial frame at this time.

If more than four satellites are used, redundant information is obtained. This is the case for professional-quality receivers used, in particular, in aeronautics. This redundant information makes it possible to eliminate satellites which would give defective information. The information is considered as defective on the grounds that it is not coherent with the measurements taken as a whole.

There are a variety of causes which may lie behind a lack of coherency, for example the presence of multiple radiofrequency wave paths between the satellite and the receiver. These multiple paths exist, in particular, when buildings or other fixed obstacles generate reflections in the vicinity of the receiver.

SUMMARY OF INVENTION

One object of the invention is to eliminate the influence of multiple paths on the position measurements as far as possible.

If the receiver receives, on the one hand, a wave transmitted in direct line of sight by a satellite, the distance measurement obtained on the basis of this direct path will give a certain value of the distance between the receiver and the satellite. If it receives a wave along a reflected path, the measurement obtained will be one corresponding to the path extended by the reflection. If the obstacle is nearby, the receiver will receive a combined signal, one part of which corresponds to the direct path and one part of which corresponds to the reflected path, and the distance measurement (using the correlation principle indicated above) will lead to a distance which is neither quite the direct path nor quite the reflected path.

For precise measurement applications, this defect is unacceptable. This is the case, in particular, for fixed reception stations which are used in differential measurement systems. In these systems, the fixed ground station takes position measurements, compares the measurements with its known fixed position, and transmits information about corrections to be made to the measurements corresponding to each satellite. The neighbouring receivers, on board vehicles, receive signals from satellites and the corrections transmitted by the fixed station. They deduce corrected position measurements therefrom. If multipaths are present, these bias the correction calculated by the fixed station. Furthermore, since the satellites are in motion, the error due to the multipaths varies continuously.

It would therefore be desirable to exclude from the measurement those satellites which give information that is defective because it is affected by a multiple-path error, or more precisely because this error is not know a priori.

It is proposed according to the invention to detect an incoherence between the variations in position measurements, which result from measurements on the phase of the pseudo-random code sent by the satellite, and the velocity measurements, which result from Doppler measurements taken on the radiofrequency carrier. If there is no coherence between the variations in position measurement and the velocity measurements, this is likely to be because there are multiple paths between the satellite and the receiver. This detection of incoherence may be carried out on each satellite axis, and the satellites for which the incoherence is greatest can be excluded from the measurements.

More precisely, the invention proposes a method for eliminating position measurement errors in a satellite positioning receiver, in which a relative distance and a relative velocity between the receiver and each satellite are measured, this method being characterized in that the time variation of the relative distance and the difference between this time variation and the relative velocity are determined, and a measure of the incoherence between the distance measurement and the velocity measurement is deduced from this difference, this incoherence representing a probable position measurement error.

In other words, if the distance as measured along a satellite axis varies in a way which does not correspond to the relative velocity as measured between the receiver and the satellite along this same axis, the measurements may be considered to be tainted with error and, beyond a certain incoherence threshold, the satellite which lies at the origin of this incoherence will be excluded from the measurement.

The principle of the invention is predominantly intended to be used on a fixed reception station which retransmits corrective messages intended for other mobile receivers, but its direct application to on-board receivers may also be envisaged.

The invention is more particularly applicable in the fixed stations of differential GPS systems which are intended to be installed in proximity to airports in order to facilitate the landing of aircraft.

Besides the method defined above, the invention relates to a receiver having the specific calculation means needed for implementing this method.

BRIEF DESCRIPTION OF THE DRAWINGS

Other characteristics and advantages of the invention will become apparent on reading the following detailed description which is given with reference to the appended drawings, in which the single figure represents the overall structure of a GPS receiver in which the present invention may be implemented.

DETAILED DESCRIPTION OF THE PREFERRED EMBODIMENTS

Figure 1:
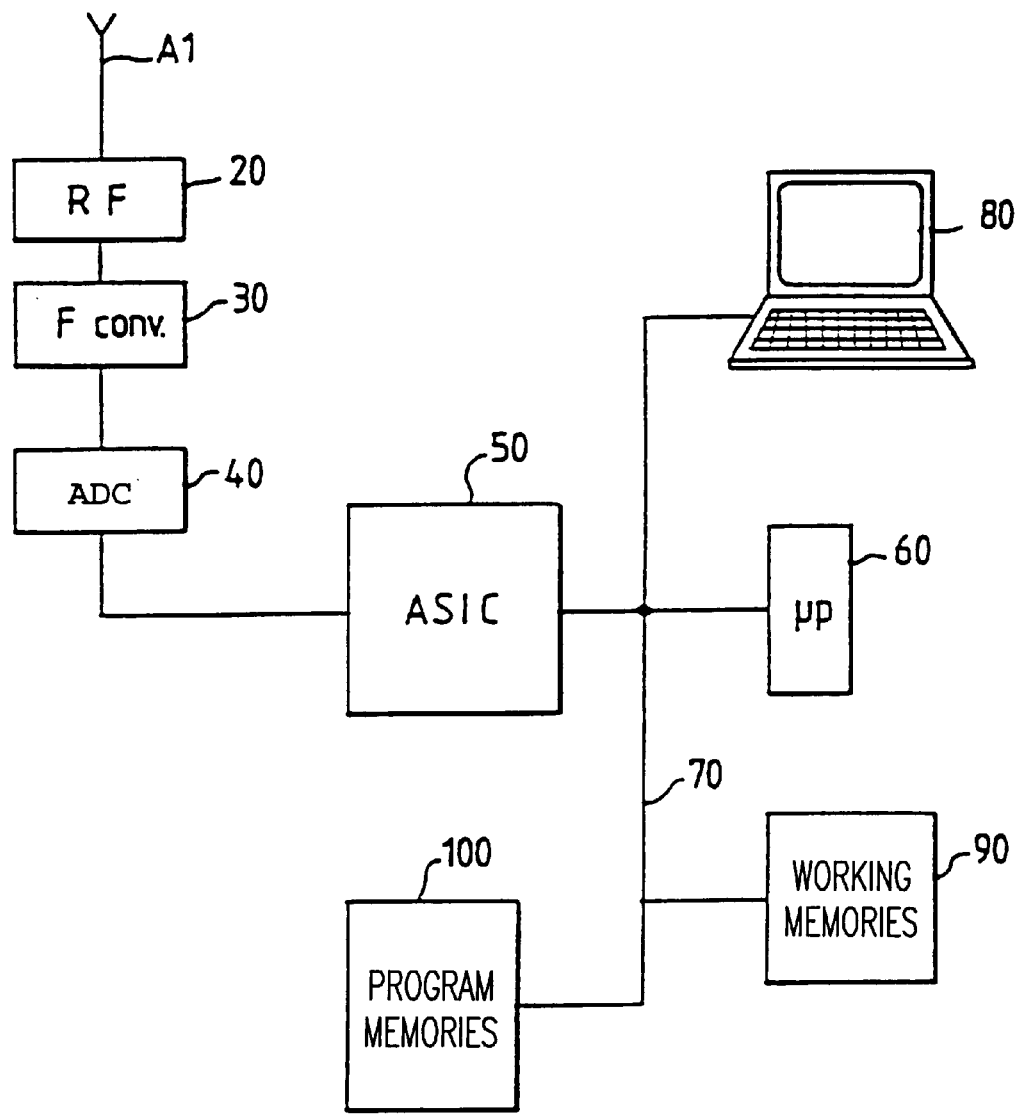

FIG. 1 gives a brief overview of the general principle of a GPS receiver. The receiver has a radiofrequency part, comprising an antenna Al, a radiofrequency amplifier 20 and various associated filtering circuits, frequency conversion circuits 30 and an analog to digital converter 40. The converter makes it possible to deliver relatively low-frequency digital signals intended to be processed in a digital signal processing circuit 50. This circuit is controlled by a microprocessor 60 and associated calculation and control software.

The microprocessor 60 has two functions:

on the one hand, it works out digital data used by the digital signal processing circuit 50, on the basis of digital data delivered by this circuit; in particular, it performs numerical calculations necessary for the digital slaving loops present in the digital processing circuit 50;

and on the other hand it gives final results of position, time and velocity calculation to the user, that is to say either on a digital display screen or on a digital bus to other equipment which need the results.

It could clearly be possible to have two separate processors for performing these two functions. In the embodiment with a single microprocessor 60, a bus 70 has been represented for exchanges between the microprocessor 60, the processing circuit 50, an input/output peripheral 80, the working memories 90, and the program memories 100 which contain the programs needed for the microprocessor to function.

Very briefly, the digital signal processing circuit has either a single processing channel, with the information from the various satellites being multiplex-processed, or preferably several channels which each work in parallel on a determined satellite.

Each channel has a double slaving loop: carrier phase slaving and code phase slaving.

The carrier phase loop essentially uses a local oscillator with digital phase control, delivering a periodic (sawtooth) digital phase at a frequency corresponding to the transposed carrier frequency, taking into account the Doppler effect to which the carrier frequency broadcasted by a satellite is subjected. The Doppler effect is taken into account by the very fact of the existence of the slaving loops. The microprocessor 60 calculates a carrier phase error signal; this signal is used to control the local oscillator in order to slave a local carrier frequency to the carrier frequency received from the satellite.

The code phase slaving loop has a local code generator driven by an oscillator with digital phase control. It makes it possible to slave the local codes to the code received from the satellite and then to be able to determine the exact temporal position of the local codes thus slaved. The local code is correlated with the code received from the satellite; the correlation signal is calculated by the microprocessor and is used to slave the loop in order to bring the local code into synchrony with the code received from the satellite.

The two slaving loops, for code and carrier, take into account the Doppler frequency shift on the carrier frequency and on the code, which result from the relative motion of the aircraft and the detected satellite. This Doppler shift can be measured in the loops.

The GPS time and position calculations are performed on the basis of the status of the slaving loops at a determined measurement time. At this time, the exact status of the phase of the two oscillators with digital phase control are read.

The slaving loops provided in the receiver act to lock a local frequency onto the carrier frequency received from the satellites. The shift between this local frequency and the stable and known frequency transmitted by the satellites gives an indication of Doppler shift and therefore the difference between the velocity of the satellite and the velocity of the receiver along the axis joining the satellite to the receiver.

Consequently, on the basis of measurements taken on the pseudo-random code, a so-called "resolved position" is calculated in the terrestrial frame; and on the basis of measurements taken on the carrier frequencies, a velocity in the terrestrial frame is calculated.

It will be assumed below that the receiver is fixed and that it calculates a position relative correction PRC with respect to its own known position, in order to send it to the mobile receivers present in the vicinity. The position correction is calculated along each satellite axis, $PRC_i$ representing the correction for satellite i, where i varies from 1 to n if there are n satellites.

According to the invention, the time variation $dPRC_i/dt$ of the correction $PRC_i$ is calculated. Furthermore, this time variation is compared with the velocity $V_i$ measured by Doppler effect along the same satellite axis i. The velocity $V_i$ represents the velocity component of the satellite i along the axis i since the reception station is fixed and therefore has zero velocity.

The time variation is calculated discretely, the position measurements being taken, for example, once per second.

The (moving) average of the successive differences $V_i - dPRC_i/dt$ is taken over several measurements (5 to 10 successive measurements), and the variation in this moving average in the course of time over a larger number of measurements (128 or 256 for example) is observed.

If the average difference does not vary, it is probable that there is no error due to multiple paths. However, if the distance varies, and above all if it varies periodically, it is very probable that there are such multiple paths. The variation periodicity comes from the fact that the satellites are moving and that the path differences due to reflections at different angles of incidence can be converted into phase variations, each 360° variation representing one period.

If the variations exceed a predetermined amplitude threshold, the measurements taken may be considered as no longer valid as regards satellite i.

In order to detect a periodic variation of the average of the difference $V_i - dPRC_i/dt$, conventional analysis methods such as the Fourier transform may be used. The 128 or 256 successive measurements taken make it possible to take a Fourier transform which shows up a variation periodicity.

Other algorithms simpler than the Fourier transform may be used to determine a periodicity and/or threshold for the variation in the difference. In any event, if it is taken over a number of samples corresponding to at least several periods of the variation, the Fourier transform will make it possible to readily show up the characteristic frequency of this variation and check whether the amplitude corresponding to this frequency is greater than the determined threshold.

Even if the variations in the average difference do not show up a clear periodicity, there may be considered to be a coherence defect if the overall energy of the variation frequency spectrum exceeds a determined threshold.

The energy of the variation frequency spectrum of the average difference represents, with or without demonstration of a characteristic periodicity, an evaluation of the incoherence between the velocity and position measurements along an axis. If there is a periodic variation, the incoherence measurement may be the amplitude measurement of the detected frequency.

The average calculated in the example which has been described is obtained on the basis of a position correction, but the same average may of course be calculated starting from the distance $PR^i$ between receiver and satellite, and not the distance correction $PRC_i$. In the case of a station which is fixed on the ground, this will in any event amount to the same thing.

What is claimed is:

1. A method for eliminating position measurement errors in a satellite positioning receiver, comprising the steps of:

measuring a relative distance and a relative velocity between the satellite positioning receiver and a respective satellite;

calculating a time variation of the relative distance;

determining a difference between the time variation and the relative velocity;

determining if the measured relative distance is coherent with the measured relative velocity based on the difference determined in the determining step;

calculating an average of successive differences determined in the determining step; and determining variations of the average, wherein a probable position measurement error exists if the average of successive differences varies.

2. The method according to claim 1, further comprising the steps of:

determining a variation level of the average calculated in the calculating step; and comparing the variation level with a determined threshold.

3. The method according to claim 1, further comprising the steps of:

searching for a characteristic variation frequency of the average calculated in the calculating step; and comparing an amplitude of variation of said characteristic variation frequency with a determined threshold.

4. A system for eliminating position measurement errors in a satellite positioning receiver, comprising:

means for measuring a relative distance and a relative velocity between the satellite positioning receiver and a respective satellite;

means for determining a time variation of the relative distance;

means for determining a difference between the time variation and the relative velocity;

means for determining if the measured relative distance is coherent with the measured relative velocity based on the difference determined by the determining means;

means for calculating an average of successive differences determined by the determining means; and means for determining variations of the average, wherein a probable position measurement error exists if the average of successive differences varies.

5. The system according to claim 4, further comprising:

means for determining a variation level of the average calculated by the calculating means; and means for comparing the variation level with a determined threshold.

6. The system according to claim 4, further comprising:

means for searching for a characteristic variation frequency of the average calculated by the calculation means; and means for comparing an amplitude of variation of said characteristic variation frequency with a determined threshold.

7. A satellite positioning receiver for eliminating position measurement errors in a satellite positioning receiver, comprising:

a measuring mechanism configured to measure a relative distance and a relative velocity between the satellite positioning receiver and a respective satellite;

a calculating unit configured to calculate a time variation of the relative distance;

a determining unit configured to determine a difference between the time variation and the relative velocity;

a determining mechanism configured to determine if the measured relative distance is coherent with the measured relative velocity based on the difference determined in the determining step;

a calculating mechanism configured to calculate an average of successive differences determined by the determining unit; and a determining mechanism configured to determine variations of the average, wherein a position measurement error probably exists if the average of successive differences varies.

8. The receiver according to claim 7, further comprising:

a determining mechanism configured to determine a variation level of the average calculated by the calculating mechanism; and a comparing mechanism configured to compare the variation level with a determined threshold.

9. The receiver according to claim 7, further comprising:

a searching mechanism configured to search for a characteristic variation frequency of the average calculated by the calculating mechanism; and a comparing mechanism configured to compare an amplitude of variation of said characteristic variation frequency with a determined threshold.

* * * * *